(12) United States Patent
Davlantes et al.

(10) Patent No.: US 10,820,283 B2
(45) Date of Patent: Oct. 27, 2020

(54) SYSTEM AND METHOD FOR WIRELESS POWER DELIVERY

(71) Applicant: Supply, Inc., Emeryville, CA (US)

(72) Inventors: Christopher Joseph Davlantes, Emeryville, CA (US); Hunter Scott, Emeryville, CA (US)

(73) Assignee: Supply, Inc., Emeryville, CA (US)

( * ) Notice: Subject to any disclaimer, the term of this patent is extended or adjusted under 35 U.S.C. 154(b) by 0 days.

(21) Appl. No.: 16/698,570

(22) Filed: Nov. 27, 2019

(65) Prior Publication Data

US 2020/0169969 A1 May 28, 2020

Related U.S. Application Data

(60) Provisional application No. 62/772,399, filed on Nov. 28, 2018.

(51) Int. Cl.
*H04W 52/42* (2009.01)
*H04W 16/28* (2009.01)

(52) U.S. Cl.
CPC .......... *H04W 52/42* (2013.01); *H04W 16/28* (2013.01)

(58) Field of Classification Search
CPC . H04W 52/34; H04W 52/283; H04W 52/223; H04W 52/42; H04W 16/28
See application file for complete search history.

(56) References Cited

U.S. PATENT DOCUMENTS

| | | | |
|---|---|---|---|
| 2005/0090287 A1* | 4/2005 | Rofougaran | H04B 1/18 455/562.1 |
| 2007/0155347 A1* | 7/2007 | Heuermann | H03H 7/40 455/107 |
| 2012/0109606 A1 | 5/2012 | Dotan et al. | |
| 2012/0300592 A1 | 11/2012 | Perry | |
| 2014/0133322 A1* | 5/2014 | Steer | H01Q 3/26 370/252 |
| 2014/0214743 A1 | 7/2014 | Chester et al. | |
| 2016/0056966 A1* | 2/2016 | Bell | H04L 12/10 713/310 |
| 2016/0099758 A1 | 4/2016 | Bell et al. | |
| 2016/0233724 A1 | 8/2016 | Bae et al. | |
| 2016/0379753 A1* | 12/2016 | Jang | G06F 30/36 703/1 |
| 2017/0077736 A1* | 3/2017 | Leabman | H02J 7/025 |
| 2017/0366242 A1* | 12/2017 | Lee | H01Q 1/243 |

OTHER PUBLICATIONS

Wang et al. "PROCEED: A Pareto optimization-based circuit-level evaluator for emerging devices." In: IEEE Transactions on Very Large Scale Integration (VLSI) Systems. Feb. 12, 2015.

* cited by examiner

*Primary Examiner* — Raymond S Dean
(74) *Attorney, Agent, or Firm* — Jeffrey Schox; Samuel Rosenthal

(57) ABSTRACT

A system for wireless power delivery, preferably including one or more power receivers and a power delivery device (or multiple power delivery devices). The power delivery device preferably includes a housing and a transmitter. Each power receiver preferably includes one or more receiver antennas and electrical loads. A method for wireless power delivery, preferably including determining transmitter-receiver proximity, determining transmission parameter values, and/or transmitting power based on the transmission parameter values.

19 Claims, 7 Drawing Sheets

SYSTEM AND METHOD FOR WIRELESS POWER DELIVERY

CROSS-REFERENCE TO RELATED APPLICATIONS

This application claims the benefit of U.S. Provisional Application Ser. No. 62/772,399, filed on 28 Nov. 2018, which is incorporated in its entirety by this reference.

TECHNICAL FIELD

This invention relates generally to the wireless power delivery field, and more specifically to a new and useful method and system in the wireless power delivery field.

BACKGROUND

Typical wireless power delivery systems restrict themselves to beamforming configurations, which may not offer high-performance results, especially in systems in which wireless power delivery is performed within a cavity. Thus, there is a need in the wireless power delivery field to create a new and useful method and system for wireless power delivery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
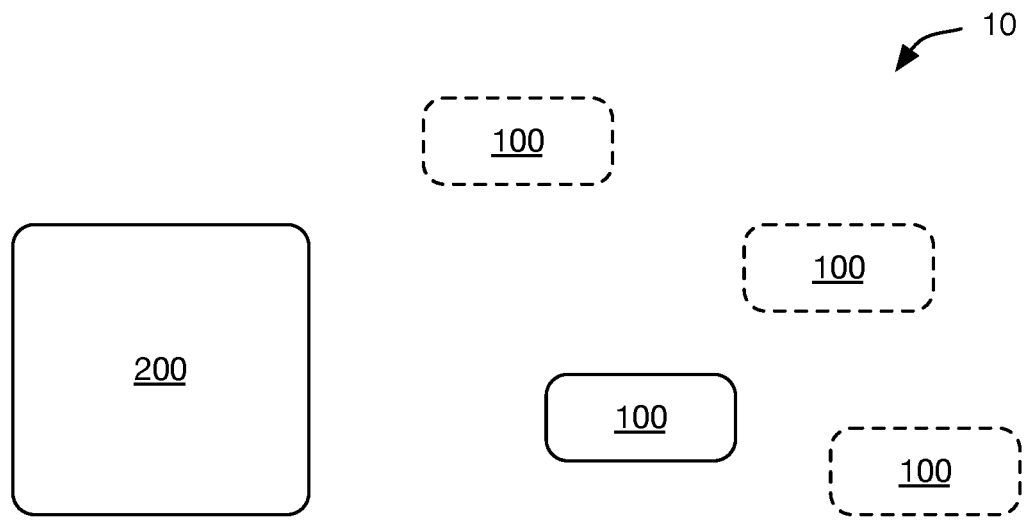
FIG. 1A is a schematic representation of an embodiment of the system.
Figure 1B:
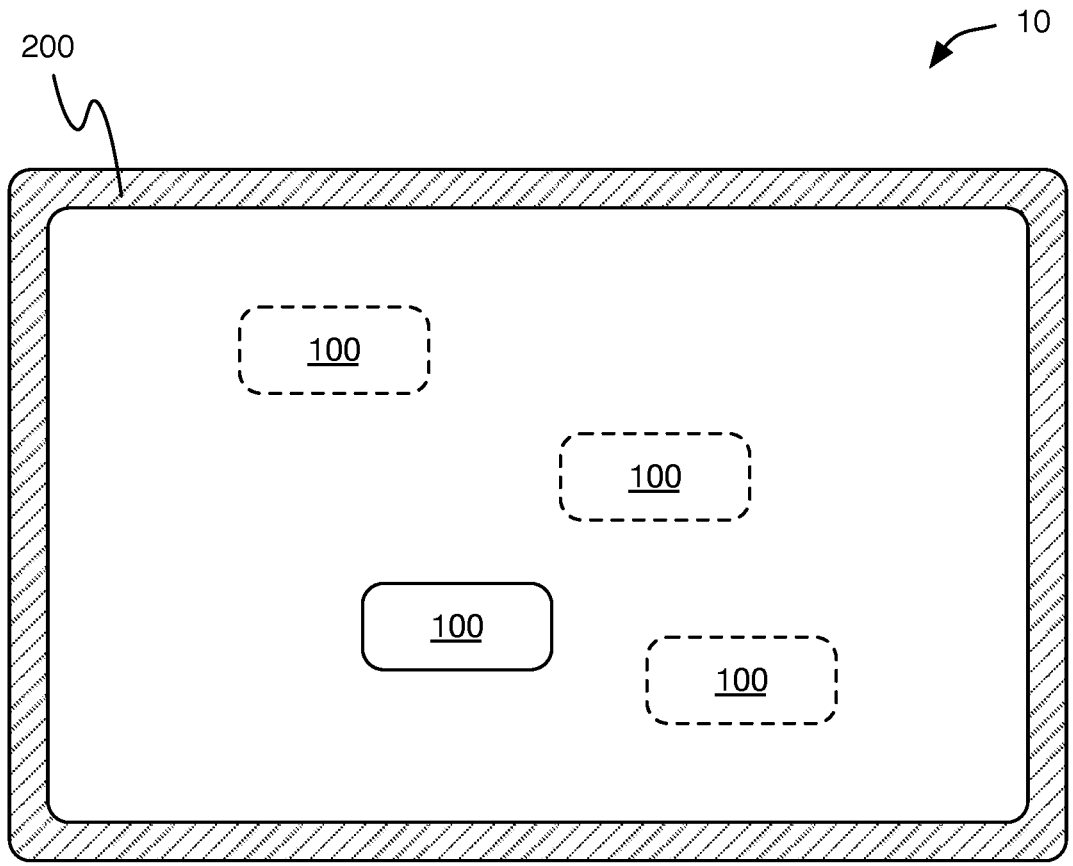
FIG. 1B is a cross-sectional view of a schematic representation of an example of the system.

A system 10 for wireless power delivery preferably includes one or more power receivers 100 and a power delivery device 200 (e.g., as shown in FIGS. 1A-1B). However, the system can additionally or alternatively include any other suitable elements. The system preferably functions to enable wireless power delivery (e.g., via radio frequency (RF) power transmission) from the power delivery device to one or more of the power receivers, but can additionally or alternatively have any other suitable function(s).

Figure 2A:
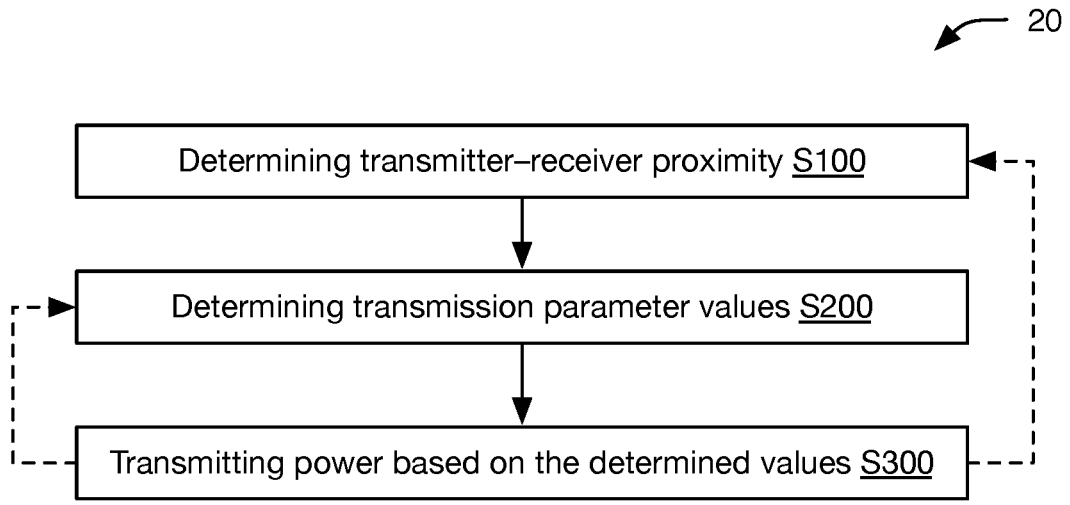
FIG. 2A is a schematic representation of an embodiment of the method.

A method 20 for wireless power delivery preferably includes determining transmitter-receiver proximity S100, determining transmission parameter values S200, and/or transmitting power based on the transmission parameter values S300 (e.g., as shown in FIG. 2A). However, the method can additionally or alternatively include any other suitable elements performed in any suitable manner. The method is preferably performed using the system, but can additionally or alternatively be performed using any other suitable system. The method preferably functions to deliver power wirelessly from the power delivery device to one or more of the power receivers, but can additionally or alternatively have any other suitable function(s). In one variation, the method functions to detect a perturbation in a housing's electromagnetic field distribution (e.g., due to new matter introduction into the housing, a change in housing shape, etc.) and to dynamically adjust the energy transmission patterns to achieve a wireless transmission target (e.g., to increase localized wireless power transfer efficiency within the housing). This method can enable the system to: operate without priori knowledge of the housing lumen configuration; to dynamically adjust to housing geometry changes; to dynamically adjust to matter (e.g., material) introduction and/or removal from the housing lumen; and/or confer any other suitable set of benefits.

In some embodiments, the system 10 and/or method 20 include one or more elements (and/or one or more entire systems and/or methods) described in U.S. patent application Ser. No. 16/001,628, filed 6 Jun. 2018 and titled "System and Method for Wireless Power Reception" and/or U.S. patent application Ser. No. 16/001,725, filed 6 Jun. 2018 and titled "Method and System for Wireless Power Delivery", both of which are herein incorporated in their entireties by this reference.

2. System.

2.1 Power Delivery Device.

Figure 3A:
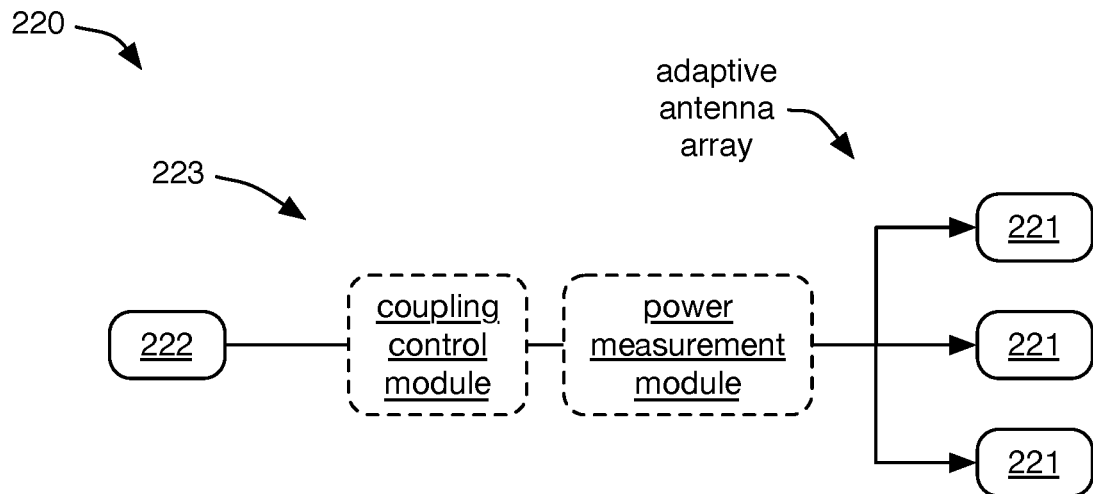
FIGS. 3A-3C are schematic representations of a first, second, and third embodiment, respectively, of elements of the transmitter.
Figure 3B:
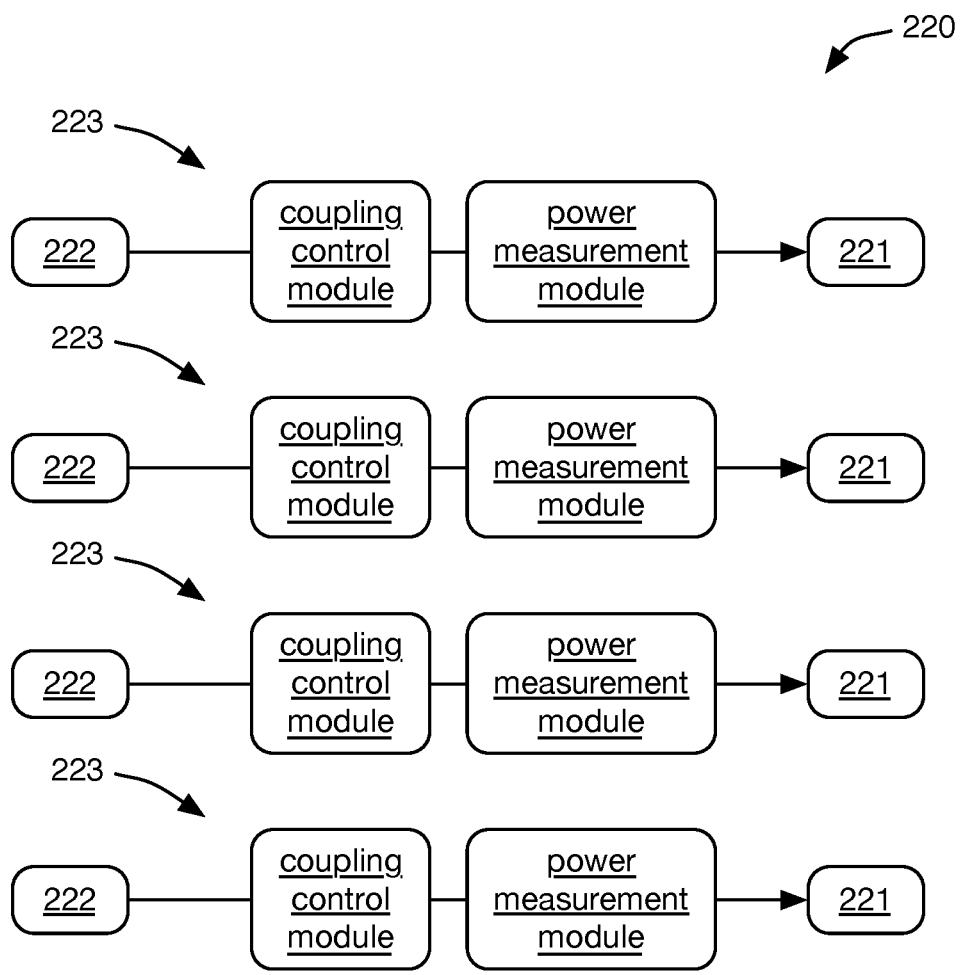
Figure 3C:
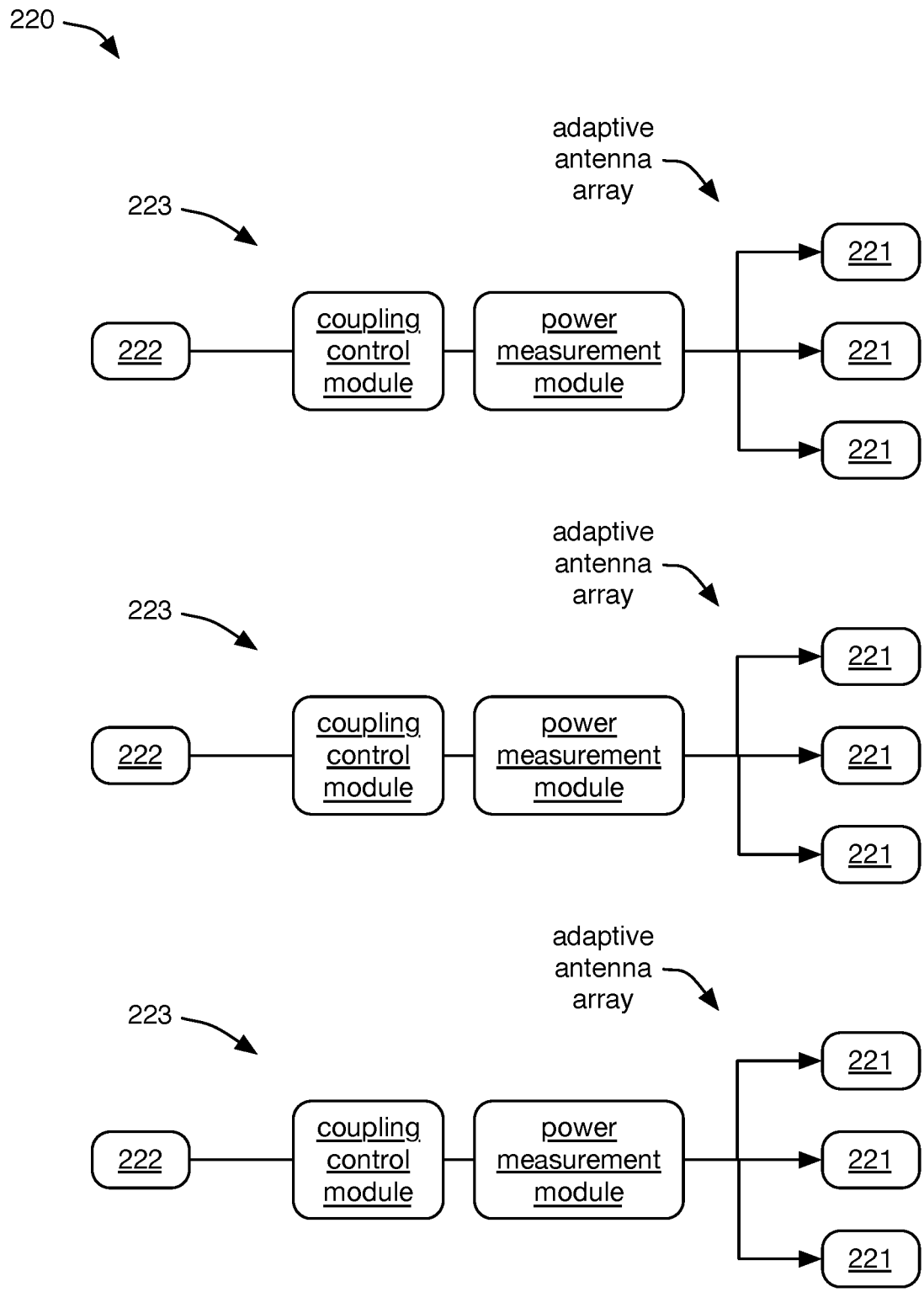
Figure 3D:
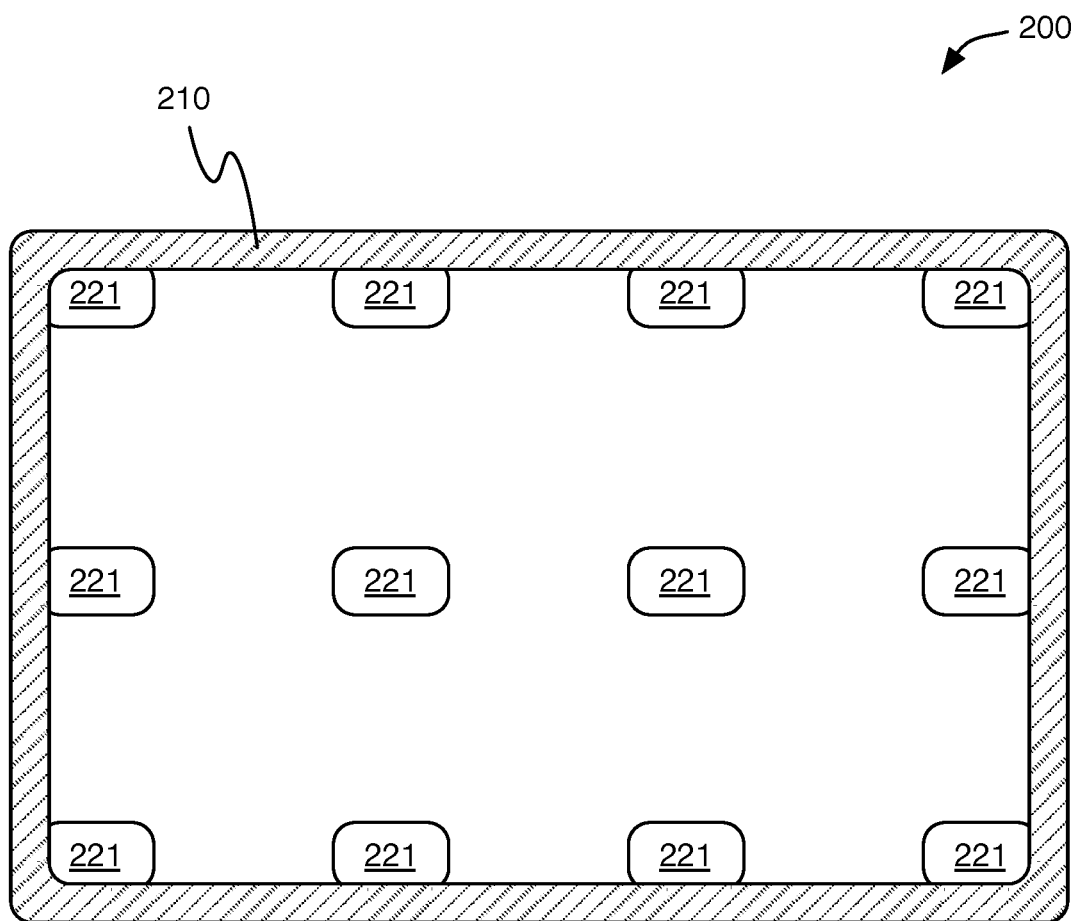
FIG. 3D is a cross-sectional view of a schematic representation of an example of a power delivery device.

The power delivery device 200 preferably includes a housing 210 and a transmitter 220 (e.g., as shown in FIG. 3C), and can additionally or alternatively include any other suitable elements. The housing preferably functions to enclose one or more power receivers 100 and/or to define an environment for wireless charging. The housing preferably defines a cavity, more preferably a fully enclosed cavity. The walls of the housing (e.g., walls defining the cavity) preferably exhibit an RF impedance (e.g., RF wave impedance) substantially different from free space. For example, the walls can be conductive and/or reflective (e.g., conductive and/or reflective to RF waves, such as the RF waves used for wireless charging). The walls preferably include one or more metals, but can additionally or alternatively include concrete, brick, wood, polymers, oxides, and/or any other suitable materials.

The housing 210 is preferably operable to open and close (e.g., includes a closure element, such as a door or lid), which can provide access to the cavity (e.g., enabling power receivers to be placed into and/or removed from the cavity). However, the housing 210 can alternatively be substantially permanently open or closed. In examples, the housing can be a toolbox, drawer, cabinet, closet, room of a building, and/or any other suitable housing.

The housing can optionally include one or more auxiliary sensors. In one example, the auxiliary sensors include an open/close state sensor (e.g., door sensor). The auxiliary sensors can additionally or alternatively include one or more IMU sensors (e.g., accelerometers). The auxiliary sensors can additionally or alternatively include one or more content sensors (e.g., configured to sample information associated with contents of the cavity), such as optical sensors (e.g., cameras, lidar, etc.), ultrasound sensors, weight sensors, and/or any other suitable content sensors. However, the auxiliary sensors can additionally or alternatively include any other suitable sensors.

The transmitter 220 preferably functions to transmit power to the power receivers (e.g., power receivers enclosed within the housing). The transmitter preferably includes one or more transmission elements 221 (e.g., elements configured to transmit electromagnetic radiation, such as RF and/or microwave power) such as transmission antennas. The antennas and/or other transmission elements can be narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. The transmission elements can optionally include one or more frequency adaptation elements (e.g., configured to control the transmission and/or resonance frequencies of the transmission elements). In some embodiments, the transmitter includes one or more elements such as described (e.g., regarding the transmitters of the system) in U.S. patent application Ser. No. 16/001,725, filed 6 Jun. 2018 and titled "Method and System for Wireless Power Delivery", which is herein incorporated in its entirety by this reference.

In a first embodiment, the transmission elements include a plurality of controllable (e.g., adaptive) transmission elements (e.g., loops, monopoles, dipoles, etc.), such as phase- and/or amplitude-controllable elements. These elements are preferably arranged at arbitrary locations throughout the power delivery device (e.g., as described below, such as arranged throughout the walls of the housing), but can additionally or alternatively be arranged in any other suitable manner.

In a second embodiment, the transmitter includes (e.g., all or some of the transmission elements define) one or more controllable (e.g., adaptive) antenna arrays (e.g., linear array, planar array, 3-D array, etc.; phased array, electronically controllable array; switched antenna array; parasitically-loaded controllable antenna array; broadband frequency adjustable array; etc.). The antenna array(s) can be arranged on one or more walls of the cavity (e.g., interior wall) and/or in any other suitable location(s).

The transmission elements preferably include a plurality of active antennas (e.g., antennas configured to be actively driven by feeds), more preferably independently-controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via one or more separate control elements, such as IQ modulators, phase shifters, variable gain amplifiers, etc., for each active antenna). In a second variation, the active antennas are separated into one or more antenna groups, wherein the antennas of a group are controlled together (e.g., via a single control element, such as an IQ modulator, phase shifter, variable gain amplifier, etc., for each group). For example, the antennas of a group can have a fixed phase offset (e.g., zero offset, such as wherein all antenna of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The transmission elements can additionally or alternatively include one or more passive antennas (e.g., configured to electrically and/or resonantly couple to one or more of the active antennas, thereby altering transmission characteristics of the transmitter). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) of the transmitter and/or their feeds (e.g., wherein varying the properties of one or more of the variable elements coupled to the antennas can function to control the net pattern of the transmitter). In a specific example of this second example, transmitter includes a single active antenna and a plurality of passive antennas, wherein one or more of the passive antennas are electrically coupled to one or more variable components. However, the transmitters can additionally or alternatively include any other suitable elements.

The transmission elements are preferably attached to and/or embedded into the housing (e.g., in and/or near the cavity, such as on one or more interior walls of the housing). In some embodiments, the elements are arranged throughout the cavity walls. For example, transmission elements can be arranged in each corner of the cavity and/or in central location on each wall. Transmission elements can optionally be arranged within the cavity volume (e.g., not embedded in and/or attached to the walls), and/or in any other suitable locations. Alternatively, the transmission elements can be arranged on a single wall of the housing, and/or in any other suitable locations. The transmission elements are optionally operable to be moved (e.g., moved automatically). For example, the power delivery device can include actuators configured to move (e.g., translate and/or rotate) one or more of the transmission elements. However, the transmission elements can additionally or alternatively be arranged in any other suitable manner.

The transmitter 220 preferably includes one or more amplifiers 222. The amplifiers preferably function to power and/or provide signal to the transmission elements 221. Accordingly, the amplifiers are preferably connected to the two transmission elements. In a first embodiment, a single amplifier 222 is connected to all the controlled transmission elements 221 (e.g., active antennas). In a second embodiment, in which the transmitter includes multiple amplifiers, different amplifiers are connected to different transmission elements, preferably wherein one amplifier (or amplifier chain) is connected to each different group of transmission elements (e.g., the controlled transmission elements being partitioned into disjoint groups, such as wherein each group is driven by a different amplifier). In a variation, there can be a one-to-one correspondence between amplifiers and controlled transmission elements, wherein each amplifier is connected to a different individual transmission element (e.g., wherein each group of transmission elements includes only a single transmission element). The amplifiers 222 are preferably connected to the transmission elements 221 via one or more connection chains 223 (e.g., wherein each connection chain 223 provides a connection between one amplifier and the transmission element group to which it is connected), such as shown by way of examples in FIGS. 3A-3C. However, the transmitter can additionally or alternatively include any other suitable amplifiers in any suitable arrangement.

The connection chain 223 can include one or more coupling control modules, power measurement modules, and/or any other suitable modules (e.g., as shown in FIG. 3B). However, the connection chain 223 can alternatively include no such modules (e.g., provide a static coupling between the amplifier and transmission elements, such as wherein the connection chain is a transmission line). The coupling control module preferably functions to control the coupling (e.g., RF coupling) between the amplifier 222 and transmission elements 221. The coupling control module can include an impedance tuner (e.g., configured to match impedance between the amplifier and transmission element). The coupling control module can additionally or alternatively include one or more switches (e.g., configured to switch the coupling between a closed state, such as one coupling the amplifier to the transmission elements, and an open state, such as one in which the transmission elements are substantially decoupled from the amplifier). However, the coupling control module can additionally or alternatively include any other suitable elements and/or have any other suitable functionalities.

The power measurement module preferably functions to measure power flow in (e.g., through) the connection chain 223 (e.g., between the amplifier and transmission elements). The power measurement module preferably quantifies the net power flow (e.g., determining flow direction and magnitude). However, the power measurement module can alternatively determine the direction of the net power flow (e.g., determining whether the net power flow is forward-propagating from the amplifier to the transmission elements, or back-propagating from the transmission elements to the amplifier) without quantification. However, the power measurement module can additionally or alternatively include any other suitable elements and/or have any other suitable functionality.

In one example, the connection chain 223 includes a dynamic impedance match (e.g., analogous to the dynamic impedance match 120 described below, but adapted for use in a transmit chain rather than a receive chain). For example, the connection chain can include one or more elements such as described in U.S. patent application Ser. No. 16/001,628, filed 6 Jun. 2018 and titled "System and Method for Wireless Power Reception", which is herein incorporated in its entirety by this reference (e.g., including the tuning network 122, power measurement module 123, and/or control network 124 described in U.S. patent application Ser. No. 16/001,628). However, the connection chain 223 can additionally or alternatively include any other suitable elements in any suitable arrangement.

The transmitter is preferably coupled to (e.g., electrically coupled to, such as connected by conductive wires; configured to receive power from; etc.) one or more power sources. The power sources can include remote power sources (e.g., power grid, external power generator, external power storage device, etc.) and/or power storage modules (e.g., wherein the power delivery device includes the power storage module(s)). The power storage module preferably includes a battery, more preferably a secondary battery but alternatively a primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. The secondary battery can have a lithium phosphate chemistry, lithium ion polymer chemistry, lithium ion chemistry, nickel metal hydride chemistry, lead acid chemistry, nickel cadmium chemistry, metal hydride chemistry, nickel manganese cobalt chemistry, magnesium chemistry, or any other suitable chemistry. The primary battery can have a lithium thionyl chloride chemistry, zinc-carbon chemistry, zinc chloride chemistry, alkaline chemistry, oxy nickel hydroxide chemistry, lithium-iron disulfide chemistry, lithium-manganese oxide chemistry, zinc-air chemistry, silver oxide chemistry, or any other suitable chemistry.

However, the transmitter can additionally or alternatively include any other suitable elements.

2.2 Power Receiver.

Figure 4A:
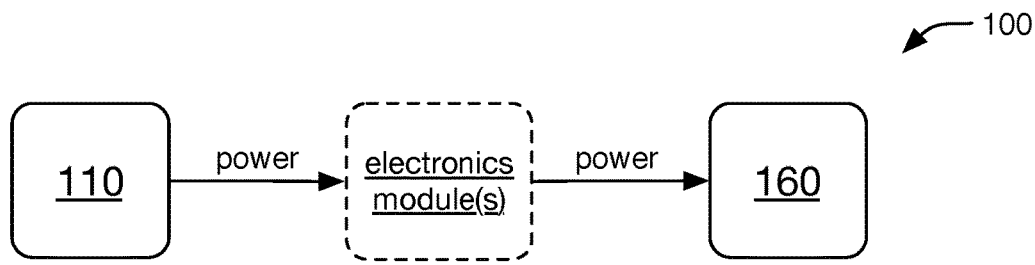
FIGS. 4A-4B are schematic representations of an embodiment of a power receiver and an example of the embodiment, respectively.
Figure 4B:
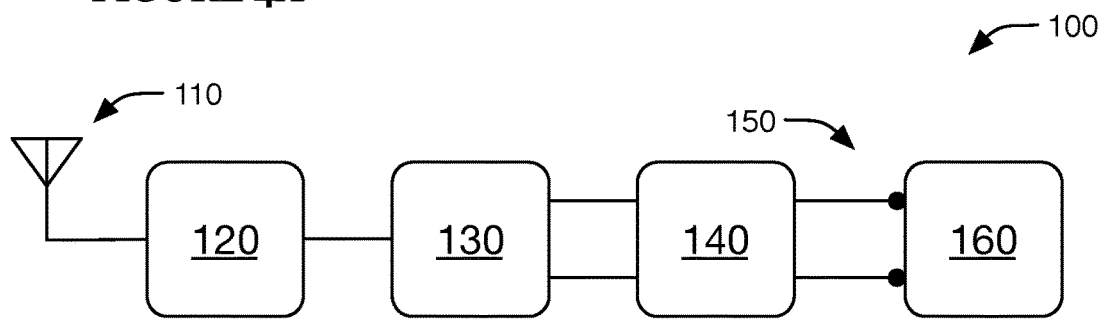

The power receiver 100 preferably includes one or more receiver antennas 110 and electrical loads 160, and can optionally include one or more electronics modules (e.g., as shown in FIG. 4A). The power receiver 100 (e.g., the electronics modules thereof) can optionally include one or more dynamic impedance matches 120, RF-DC converters 130, DC impedance converters 140, and/or DC power outputs 150 (e.g., as shown in FIG. 4B). However, the power receiver 100 can additionally or alternatively include any other suitable elements.

The receiver antennas 110 preferably function to receive power (e.g., electromagnetic radiation transmitted to the power receiver 100, preferably evanescent or "near-field" radiation but additionally or alternatively propagating or "far-field" radiation) and to couple the received power into the power receiver 100.

The receiver antennas are preferably omnidirectional antennas (e.g., as the dominant modes of transmission inside the cavity will typically not exhibit the same degree of angular asymmetry that characterizes line of sight transmission modes in free space), but can additionally or alternatively include directional antennas and/or any other suitable antennas. The antennas are preferably broadband structures (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), which can function to accommodate many different cavity modes (e.g., associated with different field conditions near the antennas, different antenna impedances arising from these different field conditions, etc.) without substantial detuning (e.g., without substantial changes in the impedance matching between the antenna and the receiver circuit), and/or can function to enable efficient use of different transmission frequencies (e.g., to compensate for receiver antenna detuning, to provide additional transmission parameters to optimize transmission over, etc.). However, the antennas can additionally or alternatively include narrowband structures (e. g., quality factor greater than a threshold, such as 50, 75, 100, 125, 150, 200, 250, 500, 30-100, 100-150, 150-300, 300-1000, or greater than 1000, etc.) and/or any other suitable structures.

In the near field, the receiver antennas (e.g., when receiving power) preferably exhibit a strong magnetic field and/or a weak electric field (e.g., strong magnetic field compared to the electric field). However, the antennas can additionally or alternatively exhibit a strong electric field in the near field and/or have any other suitable near field characteristics.

Figure 5:
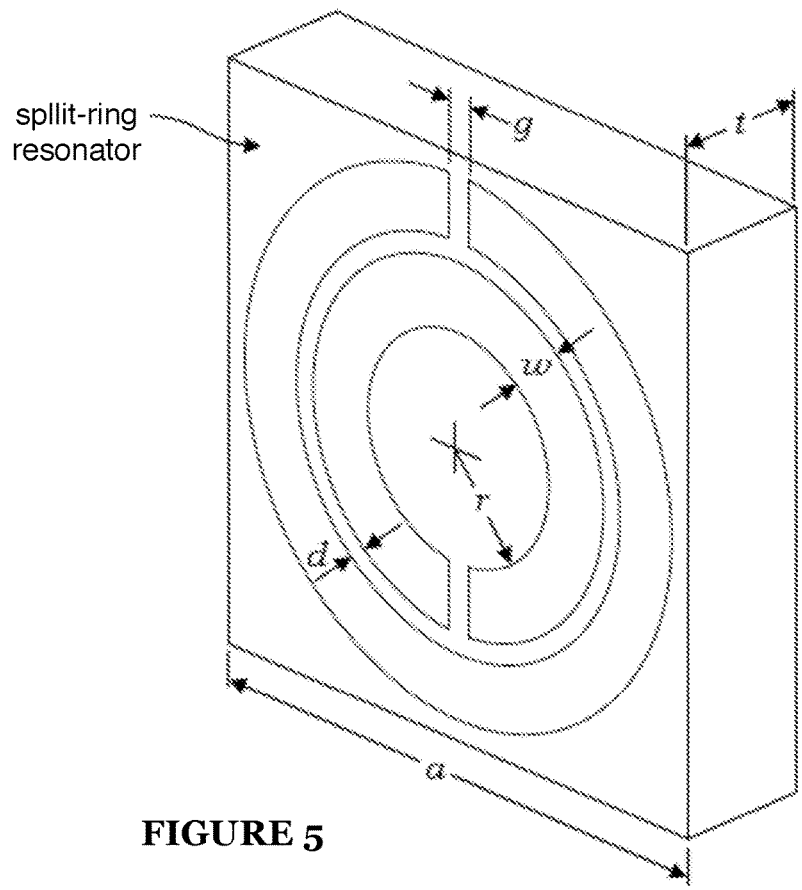
FIG. 5 is a perspective view of an example of a split-ring resonator.

In some embodiments, the receiver antennas include dipole antennas; resonant loop antennas (e.g., full wave resonant loops); ring antennas (e.g., small loops); metamaterials such as omnidirectional metamaterial antennas (e.g., split ring resonators, such as shown in FIG. 5); and/or patch antennas, preferably long patch antennas (e.g., having one dimension significantly longer than the other, preferably a long H-plane and/or radiating edges, but alternatively a long E-plane and/or non-radiating edges). However, the receiver antennas can additionally or alternatively include any other suitable antennas.

The antennas 110 can optionally include one or more elements such as described in U.S. patent application Ser. No. 16/001,628, filed 6 Jun. 2018 and titled "System and Method for Wireless Power Reception", which is herein incorporated in its entirety by this reference; in a specific example, the one or more of the antennas 110 is an antenna described in U.S. patent application Ser. No. 16/001,628. However, the power receiver 100 can additionally or alternatively include any other suitable antenna.

The electrical load 160 is preferably associated with one or more client devices (e.g., batteries, battery-containing devices, other electrical devices, etc.), more preferably wherein the power receiver 100 is configured to power the device and/or charge an energy storage element (e.g., battery) of the device. In examples, the device can be a power tool, an electronic user device (e.g., cell phone), an energy storage device such as a battery, and/or any other suitable electrical device.

For devices with RF sensitive components (e.g., sensitive electronics), one or more dissipative elements (e.g., dissipative to the RF power transmitted by the power delivery device) can optionally be placed near the RF sensitive components. Such placement may cause transmission optimization algorithms (e.g., as described below regarding the method 20) to avoid transmission conditions that create high RF intensity near the sensitive components and/or to implement transmission conditions that do not create high RF intensity near the sensitive components.

The power receiver 100 can optionally include one or more buffer energy stores (e.g., batteries), such as a battery electrically coupled between the antenna(s) and the client device (e.g., between the antenna(s) and the DC output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receiver, etc.).

In some embodiments, the power receiver 100 includes one or more dynamic impedance matches 120, RF-DC converters 130, DC impedance converters 140, DC power outputs 150, and/or any other suitable elements (e.g., as described in U.S. patent application Ser. No. 16/001,628, filed 6 Jun. 2018 and titled "System and Method for Wireless Power Reception", which is herein incorporated in its entirety by this reference). For example, one or more antennas 110 can be coupled to (e.g., configured to transmit RF power to) a dynamic impedance match 120, and/or the electrical load 160 is can be coupled to (e.g., electrically coupled to, such as connected to) the DC power output 150. However, the power receiver 100 can additionally or alternatively include any other suitable elements for coupling the electrical load(s) 160 to the antenna(s) 110 (e.g., for coupling power received at the antenna 110 into the electrical load 160).

The system can additionally or alternatively be configured to transmit and/or receive energy in any other suitable form (e.g., sonic, optical, etc.), and/or to perform any other suitable role(s).

The power delivery device and power receivers preferably each include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.).

However, the system 10, power receiver 100, and/or power delivery device 200 can additionally or alternatively include any other suitable elements in any suitable arrangement.

3. Method.

3.1 Determining Transmitter-Receiver Proximity.

Determining transmitter-receiver proximity S100 can function to indicate an opportunity for wireless power delivery (e.g., from the power delivery device to the power receiver). For example, S100 can include determining that one or more receivers are in transmission range (e.g., a range enabling efficient power transmission, substantial power transmission, any measurable power transmission, etc.) of the power delivery device (e.g., transmitter), and/or that one or more receivers are (or may be) within the cavity of the power delivery device.

In some embodiments, transmitter-receiver proximity is determined using wireless communication (e.g., using the wireless communication modules of the power delivery device and receiver). For example, one device can determine that the other is nearby based on establishment of wireless communication between them, wireless communication signal strength (e.g., RSSI), information communicated via wireless connection, and/or any other suitable indications.

Transmitter-receiver proximity S100 can additionally or alternatively be determined based on information sampled by one or more auxiliary sensors (e.g., as described above regarding the system 10). For example, the proximity can be determined directly based on the auxiliary sensor information, and/or the auxiliary sensor information can be a trigger for performing other proximity-determination elements (e.g., transmitting a beacon using the wireless communication module of the power delivery device). In a first variation, S100 is performed based on cavity closure (e.g., determined based on the open/close state sensor). In a second variation, S100 is performed based on accelerometer data (e.g., indicative of power receiver movement within the cavity, such as placement of a power receiver into the cavity; indicative of power delivery device movement; etc.). In a third variation, S100 is performed based on content sensor data, such as data indicative of object presence in the cavity.

S100 can additionally or alternatively include optical recognition (e.g., detecting a nearby receiver in an image captured by a camera), receiving a user input (e.g., button press), detecting a change in wireless power delivery and/or in quality factor of one or more elements of the system, and/or any other suitable elements. For example, a transmitter wirelessly transmitting power to a first receiver can detect changes in the environment (e.g., changes indicative of the arrival of a second receiver) based on a reduction in power delivered to the first receiver.

S100 can additionally or alternatively include determining information about the receiver and/or transmitter. The information can include device type (e.g., model, serial number, etc.), power needs (e.g., battery charge state, current power draw, etc.), likely (e.g., typical, planned, predicted, etc.) residence time in proximity, likely position stability while in proximity (e.g., stationary on table, moving in user clothing pocket, etc.), device position (e.g., based on trilateration/triangulation, optical recognition, line-of-sight proximity sensor, device IMU readings, device GPS readings, etc.), and/or any other suitable information. However, S100 can additionally or alternatively include any other suitable elements.

4.2 Determining Transmission Parameter Values.

Determining transmission parameter values S200 can function to search for transmission parameter values that can enable efficient power transmission (e.g., from the transmitters to the receivers). Transmission parameter values are preferably determined S200 in response to determining transmitter-receiver proximity S100, but can additionally or alternatively be performed at any other suitable time. The transmission parameters can include: transmission phase (e.g., relative to a reference phase, such as a transmission phase of a reference antenna) and/or transmission amplitude of one or more antennas; region excitation parameters (e.g., point excitation parameters) such as high-intensity region location (e.g., within the cavity), shape, and/or size; frequency adaptation parameters; transmission element position and/or orientation (e.g., in embodiments in which the power transmission device includes actuators configured to move the transmission elements); beamforming parameters such as beam orientation (e.g., angles describing the beam orientation, such as azimuthal angle and polar angle) and/or divergence; supergaining excitation parameters such as supergaining receiver type, position, and/or orientation; passive antenna parameters such as resistance, capacitance, and/or inductance coupled to one or more antennas (e.g., electrical component coupling parameters); and/or any other suitable parameters.

Figure 2B:
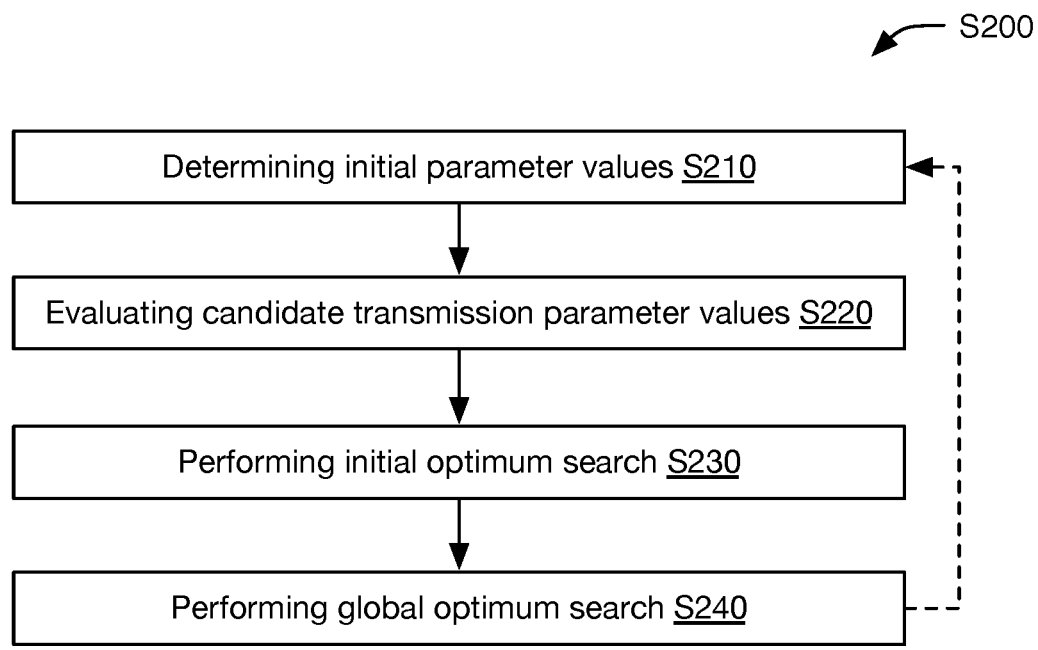
FIGS. 2B-2D are schematic representations of examples of various elements of the method.

In some embodiments, determining transmission parameter values S200 includes determining initial parameter values S210, evaluating candidate transmission parameter values S220, performing an initial optimum search S230, and/or performing a global optimum search S240 (e.g., as shown in FIG. 2B). In some embodiments, S200 (or one or more elements thereof) is performed such as described in U.S. patent application Ser. No. 16/001,725, filed 6 Jun. 2018 and titled "Method and System for Wireless Power Delivery", which is herein incorporated in its entirety by this reference. However, S200 can additionally or alternatively include any other suitable elements.

Determining initial parameter values S210 can function to provide an initial guess and/or a starting point for the optimum search.

In a first embodiment, the initial parameter values can be predetermined and/or fixed (e.g., hardcoded). The initial parameter values preferably correspond to one or more localized patterns (e.g., point-like patterns, line- or curve-like patterns, plane- or surface-like patterns, etc.), wherein most radio power is concentrated within a subset of the cavity (e.g., small volume, preferably defining a volume, area, and/or length less than a threshold fraction of the corresponding cavity dimension, such as less than 25, 15, 10, 7, 5, 4, 3, 2, 1, 0.1-0.5, 0.5-1, 1-2, 2-5, 5-10, 10-20, and/or 20-50%; point-like, box-like, or spheroidal region; extended region such as extending primarily along a line, curve, plane, or curved surface; etc.). The subset (high-intensity region) is preferably substantially centered on a point location associated with the localized (e.g., point-like) pattern. The parameter values associated with such patterns are preferably determined based on information associated with the housing, such as cavity shape and/or wall characteristics (e.g., in relation to RF radiation, such as reflection characteristics, absorption characteristics, etc.). Such parameter values can additionally or alternatively be determined based on a set of assumptions associated with the cavity conditions, preferably including the assumption that the cavity is fully enclosed by the housing (e.g., the housing door is closed). For example, the cavity can be assumed to be empty, or the cavity can be assumed to include a single power receiver, preferably assumed to be located in the high-intensity region (e.g., substantially centered on the point location). However, the initial parameter values can additionally or alternatively correspond to any other suitable radiation patterns (e.g., as described in U.S. patent application Ser. No. 16/001,725, filed 6 Jun. 2018 and titled "Method and System for Wireless Power Delivery", which is herein incorporated in its entirety by this reference). The initial parameter values can additionally or alternatively include randomly-selected values (e.g., modifying the predetermined and/or fixed values).

The initial parameter values can additionally or alternatively be determined based on historical data (e.g., as described in U.S. patent application Ser. No. 16/001,725, filed 6 Jun. 2018 and titled "Method and System for Wireless Power Delivery", which is herein incorporated in its entirety by this reference). However, the initial parameter values can additionally or alternatively be determined in any other suitable manner (e.g., determined randomly).

Figure 2C:
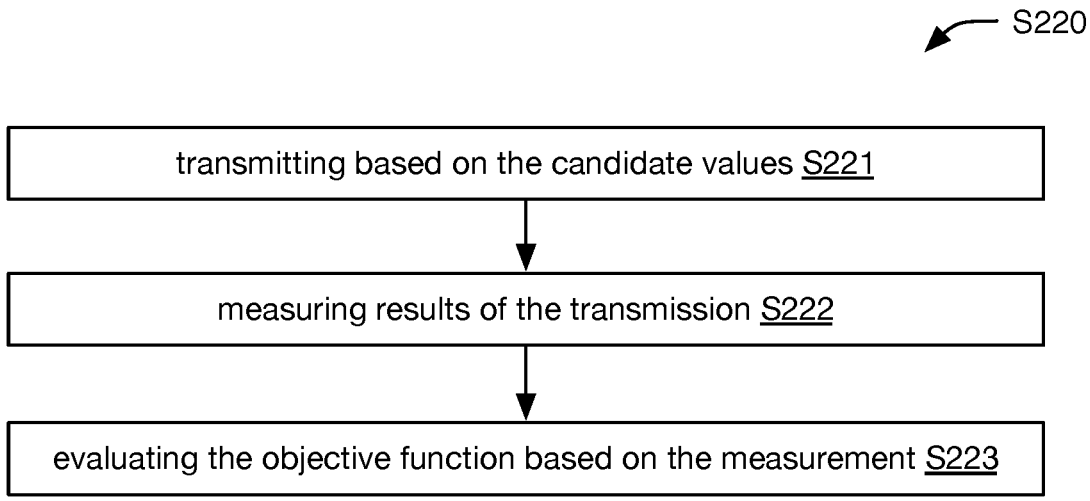

Evaluating candidate transmission parameter values S220 can function to determine the objective function value associated with the candidate transmission parameter values. S220 is preferably performed as described in U.S. patent application Ser. No. 16/001,725, filed 6 Jun. 2018 and titled "Method and System for Wireless Power Delivery", which is herein incorporated in its entirety by this reference; for example, S220 can include transmitting based on the candidate values S221, measuring results of the transmission S222, and/or evaluating the objective function based on the measurement S223, such as described in U.S. patent application Ser. No. 16/001,725 and/or as shown by way of example in FIG. 2C. However, S220 can additionally or alternatively be performed in any other suitable manner. The candidate values are preferably evaluated S220 during the optimum searches (e.g., as described below, such as regarding S230 and/or S240). However, they can additionally or alternatively be evaluated S220 at any other suitable time.

In some embodiments (e.g., embodiments in which the transmitter includes multiple transmit chains), S220 includes adjusting transmit chain operation (e.g., during S221). Adjusting transmit chain operation preferably functions to compensate for power reflection (e.g., from modes in the cavity) into one or more of the transmission elements (e.g., compensating for back-propagating power, such as power flowing from a transmission element to the amplifier coupled to that transmission element). Adjusting transmit chain operation can additionally or alternatively function to optimize forward-propagating power transmission, such as optimizing antenna tuning, and/or can have any other suitable function. For example, adjusting transmit chain operation can include performing impedance matching between the amplifiers and connected transmission elements (e.g., at the associated impedance tuners). Adjusting transmit chain operation preferably includes controlling the amplifiers and/or connection chain elements (e.g., coupling control modules).

Figure 2D:
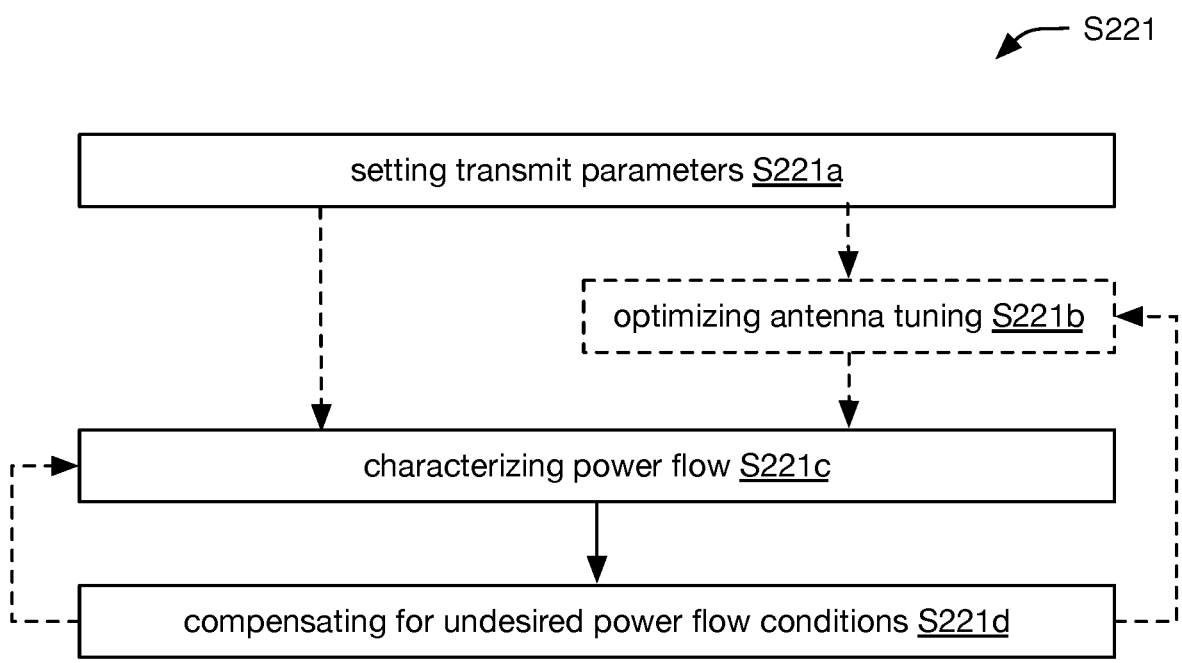

In one embodiment, S221 can include: setting transmit parameters S221a; optimizing antenna tuning S221b; characterizing power flow S221c; and/or compensating for undesired power flow conditions S221d (e.g., as shown in FIG. 2D). However, S221 can additionally or alternatively include any other suitable elements performed in any suitable manner.

Setting transmit parameters S221a is preferably performed based on transmit parameter values (e.g., dictated by the transmission optimization process). The transmit parameters preferably include phase and/or amplitude for each independently controlled transmission element, but can additionally or alternatively include any other suitable transmit parameters. For example, S221a can include controlling one or more components, such as amplifiers, delays, switches, and/or any other suitable components, to achieve the desired transmission conditions (e.g., desired phase and/or amplitude for each transmission element). However, S221a can additionally or alternatively include setting transmit parameters in any other suitable manner.

Optimizing antenna tuning S221b is preferably performed at the coupling control module (e.g., at the impedance tuner of the coupling control module) of each connection chain (or a subset thereof). S221b is preferably performed in embodiments in which the connection chain includes an impedance tuner. The impedance tuner is preferably controlled to maximize the forward-propagating power (e.g., measured at the power measurement module of the connection chain). S221b is perfectly not performed for transmission elements in a detuned or decoupled state (e.g., detuned or decoupled in a previous iteration of S221d), but can alternatively be performed for some such elements (e.g., elements for which recoupling is being tested, such as described below). S221b is preferably performed after setting transmit parameters S221a, but can additionally or alternatively be performed at any other suitable time. The antenna tuning can be optimized concurrently for all connection chains, optimized sequentially, optimized in batches, and/or performed in any other suitable order and/or with any other suitable timing. In some examples, the antenna tuning is optimized such as described in U.S. patent application Ser. No. 16/001,628, filed 6 Jun. 2018 and titled "System and Method for Wireless Power Reception", which is herein incorporated in its entirety by this reference (e.g., as described in U.S. patent application Ser. No. 16/001,628 regarding dynamically adjusting an input impedance of a dynamic impedance match coupled to the antenna). Although described herein as antenna tuning, a person of skill in the art will recognize that S221b can analogously include optimizing tuning for any other suitable transmission elements.

Characterizing power flow S221c is preferably performed at the power measurement module of each connection chain, but can additionally or alternatively be performed at the amplifiers and/or any other suitable elements of the system. S221c can be performed concurrently with optimizing antenna tuning S221b (e.g., based on the power measurements made during performance of S221b), can be performed after S221b, can be performed after S221a (e.g., in embodiments in which S221b is not performed), and/or can be performed with any other suitable timing. S221c can include (for each connection chain, or each of a subset thereof) quantifying the net power flow, determining whether the net power flow is forward- or back-propagating, and/or determining any other suitable aspects of the power flow. S221c can include identifying one or more undesired power flow conditions (e.g., associated with a particular connection chain). The undesired conditions can include back-propagating power conditions, net power flow falling below a threshold value (e.g., forward-propagating power less than a threshold fraction of the amplifier driving power, such as less than 1, 2, 5, 10, 15, 20, 25, 35, 50, 1-3, 3-10, 10-30, or 30-50%, etc.; back-propagating power greater than a threshold fraction of the amplifier driving power, such as greater than 1, 2, 5, 10, 15, 20, 25, 35, 50, 1-3, 3-10, 10-30, or 30-50%), and/or any other suitable conditions. However, S221c can additionally or alternatively include any other suitable power flow characterization.

Compensating for undesired power flow conditions S221d is preferably performed in response to identifying such conditions (e.g., in S221c). S221d is preferably performed at the coupling control module (e.g., coupling control module of the connection chain with the undesired condition) and/or amplifier (e.g., the amplifier connected to the connection chain with the undesired condition). S221d can be performed for all such chains (e.g., concurrently), performed for only one such chain at a time (e.g., wherein S221d can be performed for other such chains in future iterations if the undesired condition is still present, such as after repeating S221b and/or S221c), and/or for any other suitable connection chains. In embodiments in which S221d is performed for only a subset of the connection chains with undesired power flow conditions (e.g., performed for only one such chain in a given iteration), the chains can be selected based on severity of the undesired condition (e.g., greatest amount of back-propagating power), selected based on chain impact predictions and/or estimations (e.g., performed for chains predicted to have significant negative impact on other connection chains of the transmitter), selected based on a predetermined or random order, and/or selected in any other suitable manner.

Compensating for undesired power flow conditions S221d can include decoupling the transmission element from the amplifier (e.g., at the coupling control module). For example, this can include detuning the connection chain (e.g., controlling the impedance tuner to create an impedance mismatch with the amplifier output) and/or disconnecting the connection chain (e.g., setting a connection switch to an open state). S221d can additionally or alternatively include reducing the driving power of the associated amplifier, preferably reducing such power to zero or substantially zero, but alternatively to some non-zero fraction of the original power. S221d can additionally or alternatively include providing information indicative of the undesired condition to the transmission parameter optimization algorithm. For example, such information can be incorporated into a penalty term of an objective function, incorporated into a constraint in a multi-objective optimization, and/or used in any other suitable manner to optimize the transmission parameters. However, S221d can additionally or alternatively include compensating for the undesired power flow conditions in any other suitable manner.

S221 can optionally include repeating one or more of these elements. For example, S221 can include repeating one or more of S221b, S221c, and/or S221d (e.g., until a convergence criterion is met). The convergence criterion can include elimination of the undesired power flow conditions, can include diminishment of the undesired conditions to less than a threshold value, can include exceeding a repetition limit, such as a time or iteration count limit, can include exceeding a transmission element decoupling threshold (e.g., wherein more than a threshold number of transmission elements have been decoupled, until fewer than a threshold number of transmission elements remain coupled, etc.), and/or can include any other suitable convergence criteria. For example, S221 can include repeating S221b, S221c, and S221d, decoupling a single transmission element (or transmission element group) during each iteration, until the undesired power flow conditions are eliminated.

S221 can optionally include recoupling some of the decoupled transmission elements. For example, after the convergence criterion is met (e.g., undesired power flow conditions have been diminished or eliminated) and/or after a plurality of transmission elements have been decoupled, S221 can include recoupling one or more of the decoupled transmission elements and then repeating some of the elements described above (e.g., repeating S221b, S221c, and/or S221d). Different sets of recoupled elements can be tested (e.g., repeating S221b, S221c, and/or S221d after each recoupling), wherein the set with the best overall performance (e.g., greatest total power output from the transmitter, greatest number of coupled transmission elements without significant undesired power flow conditions, lowest total back-propagating power flow, highest transmitter power efficiency, etc.) is determined.

In some embodiments, preferably some embodiments in which the transmitter includes a single amplifier chain, such as an amplifier configured to power an adaptive antenna array (e.g., as shown in FIG. 3A), S221 can omit one or more of the elements described above, such as omitting S221d and optionally omitting S221c. It may be preferable to omit these elements for such transmitters, such as due to a reduced need to compensate for reflected power (e.g., wherein power reflected off one port of the adaptive array is inherently redirected to other port(s) of the adaptive array). For example, in such embodiments, S221 can include setting transmit parameters S221a and optionally optimizing antenna tuning S221b. Additionally or alternatively, such embodiments can include S221c, S221d, and/or any other suitable elements.

However, S221 can additionally or alternatively include controlling the transmitter in any other suitable manner, and/or S220 can additionally or alternatively include any other suitable elements performed in any suitable manner.

Performing an initial optimum search S230 can function to quickly determine potential parameter values. S230 can be performed as described in U.S. patent application Ser. No. 16/001,725, filed 6 Jun. 2018 and titled "Method and System for Wireless Power Delivery", which is herein incorporated in its entirety by this reference, but can additionally or alternatively be performed in any other suitable manner.

An initial search is preferably performed in response to determining initial parameter values S210 (e.g., beginning the search with the initial parameter values), and can additionally or alternatively be performed during a global optimum search (e.g., as described below regarding S240) and/or at any other suitable times. The initial search is preferably a local search, but can additionally or alternatively include a global search and/or a search of any other suitable type. In one embodiment, in which the initial parameter values include (e.g., are) region excitation parameters (e.g., point excitation parameters associated with a localized pattern, such as a point-like pattern), the initial search can include performing a search in the initial parameter space (e.g., region excitation parameter space). For example, the initial search can include moving the high-intensity region location (e.g., moving the associated point) within the cavity (e.g., sweeping the cavity, such as in a 3-dimensional spatial search for a point excitation region). Additionally or alternatively, the initial search can include a search using extended localized patterns (e.g., extended over curves and/or surfaces).

In some examples, the initial search includes a plurality of search steps. For example, the initial search can begin by moving an extended localized pattern (preferably extended over a surface such as a plane, but alternately extended over a curve and/or over any other suitable geometry) through the cavity (e.g., sweeping the surface from one end of the cavity to the other), which can enable determination of one or more regions in which the receiver(s) are present, such as the regions in which the localized pattern was located when the receiver(s) experience superior power reception. In variations of this example, extended localized patterns of different orientations (e.g., substantially orthogonal planes) can be moved (e.g., swept) through the cavity, thereby enabling more precise determination of receiver locations (e.g., wherein the receivers are known to be located at or near the intersection of differently-oriented patterns for which their power reception was superior). In this example, the initial search can optionally continue by using smaller-volume localized patterns (e.g., point-like patterns) to search for the receivers in the regions identified using the extended localized patterns (e.g., as described above). In this example, the search using the extended pattern(s) is preferably a global search (e.g., low-resolution global search) but can additionally or alternatively include a local search, whereas the subsequent search using the point-like patterns is preferably a local search but can additionally or alternatively include a global search.

Performing a global optimum search S240 can potentially function to determine superior transmission parameter values (e.g., an optimized parameter value set). S240 is preferably performed as described in U.S. patent application Ser. No. 16/001,725, filed 6 Jun. 2018 and titled "Method and System for Wireless Power Delivery", which is herein incorporated in its entirety by this reference, but can additionally or alternatively be performed in any other suitable manner.

The global search is preferably performed S240 in response to completion of the initial search (e.g., beginning the search with the optimal parameter values found by the initial search), but can additionally or alternatively be performed in response to determining initial parameter values S210 (e.g., beginning the search with the initial parameter values) and/or at any other suitable time. A global search is preferably performed S240 only if the global search is likely to be beneficial. For example, the global search can be performed if the result of the initial search is poor (e.g., the maximum objective function value found is less than a threshold objective function value), if the global search is expected to yield a significant improvement over the initial search (e.g., based on the pattern of objective function values determined during the initial search), if the receiver is expected to remain in range for an extended period of time (e.g., long enough to justify a reduction in charging efficiency during global search performance), and/or based on any other suitable criteria. However, the global search can additionally or alternatively be performed under any other suitable circumstances (e.g., can be performed in all cases).

However, S200 can additionally or alternatively include determining (e.g., optimizing) transmission parameter values in any other suitable manner.

4.3 Transmitting Power Based on the Transmission Parameter Values.

Transmitting power based on the transmission parameter values S300 can function to wirelessly deliver power to the receiver. S300 is preferably performed as described in U.S. patent application Ser. No. 16/001,725, filed 6 Jun. 2018 and titled "Method and System for Wireless Power Delivery", which is herein incorporated in its entirety by this reference, but can additionally or alternatively be performed in any other suitable manner.

Power is preferably transmitted S300 in response to determining the transmission parameter values S200, but can additionally or alternatively be performed at any other suitable time. Transmission parameter value determination S200 (e.g., initial searching S230, global searching S240, etc.) can optionally be repeated during power transmission S300 (e.g., wherein power transmission is temporarily halted during parameter value determination). Repeated performances of S200 preferably use the most recently determined transmission parameter values as initial values, but can additionally or alternatively use any other suitable values (e.g., as done during the initial performance of S200, using other previously-determined values, etc.). S200 can be repeated in response to detecting a change (e.g., greater than an absolute or relative threshold) in delivered power, detecting movement (e.g., based on receiver and/or transmitter measurements, such as IMU measurements), detecting an additional receiver and/or transmitter in proximity to the system S100, receiving a user input, can be repeated periodically (e.g., at a predetermined rate; at a dynamically-determined rate, such as determined based on an observed and/or expected temporal and/or spatial stability of the system and/or its performance, preferably wherein lower stability corresponds to a more rapid rate; etc.), sporadically, randomly, and/or can be repeated at any other suitable time.

In embodiments including multiple receivers, preferably wherein multiple receivers are concurrently arranged within the cavity, the method can optionally include transmitting power to a plurality of the receivers (e.g., concurrently). In some such embodiments, the method can include elements such as described in U.S. patent application Ser. No. 16/539,288, filed 13 Aug. 2019 and titled "Method and System for Wireless Power Delivery" and/or in U.S. Patent Application 62/888,817, filed 19 Aug. 2019 and titled "Methods and Systems for Multi-Objective Optimization and/or Wireless Power Delivery", each of which is herein incorporated by this reference (e.g., wherein S200 is performed as described in U.S. patent application Ser. No. 16/539,288 regarding assessing transmission parameters S400, such as wherein S200 includes performing multi-objective optimizations such as described in U.S. Patent Application 62/888,817).

In some embodiments, S300 includes adjusting transmit chain operation (e.g., as described above regarding adjusting transmit chain operation during S220), such as tuning and/or (selectively) detuning (and/or disconnecting) transmission elements, selectively operating or not operating amplifiers, and/or adjusting transmit chain operation in any other suitable manner. For example, transmit chain operation can be adjusted while configuring the transmitter to operate based on the transmission parameter values (e.g., while beginning to perform S300), throughout performing S300 (e.g., continuously, periodically, sporadically, in response to triggers, such as changes in transmission performance, system configuration, etc.), and/or with any other suitable timing.

However, power can be transmitted S300 in any other suitable manner, and the method can additionally or alternatively include any other suitable elements performed in any other suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for wireless power transmission, comprising:
at a transmitter comprising a plurality of transmission elements within a cavity, controlling the plurality of transmission elements to generate a localized excitation pattern, wherein the localized excitation pattern defines a high-intensity region within the cavity;
while generating the localized excitation pattern, at a receiver within the cavity, determining second information associated with efficiency of power transmission to the receiver via the localized excitation pattern;

determining a first transmission parameter value set based on the second information and the localized excitation pattern;

after generating the localized excitation pattern, determining the second information, and determining the first transmission parameter value set, at the transmitter, during a time interval, operating based on the first transmission parameter value set;

at the receiver, during the time interval, receiving power transmitted by the transmitter;

determining information associated with efficiency of power transmission from the transmitter to the receiver during the time interval;

determining a second transmission parameter value set based on the information and the first transmission parameter value set; and at the transmitter, after the time interval, in response to determining the second transmission parameter value set, transmitting power based on the second transmission parameter value set;

wherein the first and second transmission parameter value sets are associated with the plurality of transmission elements.

2. The method of claim 1, wherein the transmitter transmits power based on the first transmission parameter value set substantially throughout the time interval.

3. The method of claim 1, wherein the information is determined at the receiver.

4. The method of claim 3, wherein determining the information comprises determining an amount of power received at the receiver during the time interval.

5. The method of claim 1, further comprising, before determining the first transmission parameter value set:
at the transmitter, controlling the plurality of transmission elements to generate a second localized excitation pattern, wherein the localized excitation pattern defines a second high-intensity region, different from the first high-intensity region, within the cavity; and
while generating the second localized excitation pattern, at the receiver, determining third information associated with efficiency of power transmission to the receiver via the second localized excitation pattern;
wherein determining the first transmission parameter value set is performed based further on the third information and the second localized excitation pattern.

6. The method of claim 1, further comprising, before determining the first transmission parameter value set, performing an initial optimum search, comprising sweeping the high-intensity region within the cavity, wherein the first transmission parameter value set is determined based further on a result of the initial optimum search.

7. The method of claim 1, wherein determining the second transmission parameter value set is performed according to an optimization algorithm, comprising, based on the information, determining a value of an objective function associated with the optimization algorithm.

8. The method of claim 1, wherein determining the second transmission parameter value set is performed according to an optimization algorithm, comprising, based on the information, determining a value of an objective function associated with the optimization algorithm.

9. The method of claim 8, further comprising performing an optimum search, over a parameter space associated with the adaptive antenna array, according to the optimization algorithm, wherein:
performing the optimum search comprises determining the information and determining the second transmission parameter value set; and
the second transmission parameter value set is associated with an optimum value.

10. The method of claim 9, wherein the optimum search comprises at least one of a local search and a stochastic global search.

11. The method of claim 9, further comprising:
at a second receiver within the cavity, during the time interval, receiving power transmitted by the transmitter; and
determining second information associated with efficiency of power transmission from the transmitter to the second receiver during the time interval;
wherein the optimum search is a multi-objective search, wherein the second transmission parameter value set is determined based further on the second information.

12. The method of claim 1, wherein the second transmission parameter value set comprises, for each transmission element, a respective first phase value, and the second transmission parameter value set comprises, for each transmission element, a respective second phase value.

13. The method of claim 1, further comprising, before the time interval, configuring the transmitter based on the first transmission parameter value set, comprising:
at a set of one or more amplifiers of the transmitter, driving the plurality of transmission elements based on the first transmission parameter value set, wherein the plurality of transmission elements comprises an antenna resonantly coupled to an amplifier of the set via a connection chain of the transmitter;
while driving the plurality of transmission elements based on the first transmission parameter value set, determining that a net power flow through the connection chain is a back-propagating flow directed from the antenna toward the amplifier; and
in response to determining that the net power flow is back-propagating, controlling the connection chain in a low-coupling state, in which resonant coupling between the antenna and the amplifier is reduced;
wherein, during the time interval, the connection chain is maintained in the low-coupling state.

14. A system for wireless power transmission, comprising:
a power transmitter comprising a plurality of transmission elements, wherein:
the power transmitter controls the plurality of transmission elements to generate a localized excitation pattern, wherein the localized excitation pattern defines a high-intensity region within a cavity;
after the plurality of transmission elements generate the localized excitation pattern, the power transmitter controls the plurality of transmission elements to transmit RF power based on a first transmission parameter value set;
the power transmitter receives a metric from the power receiver;
based on the metric and the first transmission parameter value set, the power transmitter determines a second transmission parameter value set different from the first transmission parameter value set; and
the power transmitter controls the plurality of transmission elements to transmit RF power based on the second transmission parameter value set;

a power receiver comprising a power measurement element, wherein:
  while the plurality of transmission elements generate the localized excitation pattern, before the power transmitter controls the plurality of transmission elements to transmit RF power based on a first transmission parameter value set, the receiver determines information associated with efficiency of power transmission to the receiver via the localized excitation pattern;
  the power receiver receives RF power from the power transmitter;
  at the power measurement element, the power receiver determines a measurement of the RF power received;
  the power receiver determines the metric based on the measurement; and
  the power receiver transmits the metric to the power transmitter; and
a housing defining the cavity, the cavity enclosing the power receiver and the plurality of transmission elements;
wherein, before the power transmitter controls the plurality of transmission elements to transmit RF power based on a first transmission parameter value set, the system determines the first transmission parameter value set based on the information and the localized excitation pattern.

15. The system of claim 14, wherein an RF impedance of the housing is substantially different from free space.

16. The system of claim 14, wherein a set of transmission elements of the plurality are arranged on a wall of the housing.

17. The system of claim 16, wherein the set of transmission elements define a substantially uniform array on the wall.

18. The system of claim 16, wherein the transmission elements of the plurality are arranged surrounding the receiver.

19. The system of claim 14, wherein the power transmitter further comprises a set of connection chains, wherein:
  each connection chain of the set is associated with a respective transmission element of the plurality;
  each connection chain of the set comprises a coupling control module and a power measurement module;
  the power measurement module measures net power flow through the respective transmission element;
  the coupling control module controls RF coupling between the respective transmission element and a set of amplifiers of the power transmitter; and
  in response to detecting back-propagating power flow through a transmission element, the associated coupling control module reduces the RF coupling between the transmission element and the set of amplifiers.

* * * * *